United States Patent [19]
Schramm et al.

[11] 3,990,523
[45] Nov. 9, 1976

[54] PISTON ENGINE POWERED ROTARY DRIVE WITH MOUNT AND FUEL CONTAINER

[76] Inventors: Buford J. Schramm, 1330 E. Fremont, Tempe, Ariz. 85282; Robert G. Everts, 2118 E. Birchwood Ave., Mesa, Ariz. 85204

[22] Filed: Mar. 17, 1975

[21] Appl. No.: 558,814

[52] U.S. Cl. .............................. 173/162; 16/110.5; 173/163; 173/170; 222/187; 222/191
[51] Int. Cl.² .................................... B23B 45/00
[58] Field of Search .................... 173/163, 170, 162; 175/170; 222/187, 191; 16/110.5; 220/63 A

[56] References Cited
UNITED STATES PATENTS

| | | | |
|---|---|---|---|
| 1,647,554 | 11/1927 | Trapnell | 173/170 X |
| 1,934,935 | 11/1933 | Luxmore | 173/170 X |
| 2,016,667 | 8/1935 | Crowell | 173/163 X |
| 2,430,817 | 11/1947 | Jackson | 173/163 X |
| 2,479,750 | 8/1949 | Lewandowski | 16/110.5 |
| 2,816,539 | 12/1957 | Church | 16/110.5 |
| 2,975,848 | 3/1961 | Roberts | 173/163 |
| 3,077,547 | 2/1963 | Metko | 173/163 |
| 3,096,832 | 7/1963 | Westre | 173/163 X |
| 3,182,732 | 5/1965 | Earnest | 175/170 X |
| 3,650,431 | 3/1972 | Stewart | 220/63 A X |
| 3,845,557 | 11/1974 | Bailey | 173/162 |

*Primary Examiner*—Ernest R. Purser
*Assistant Examiner*—William F. Pate, III
*Attorney, Agent, or Firm*—Donald D. Mon

[57] ABSTRACT

A rotary drive powered by a piston engine provided with a ring-shaped engine mount which is also a fuel container and can be used as a handle, as a guard, and as part of a "stand" for the drive. Optionally, the rotary drive can be provided with handles, one of which carries a throttle control.

14 Claims, 6 Drawing Figures

PISTON ENGINE POWERED ROTARY DRIVE WITH MOUNT AND FUEL CONTAINER

This invention relates to a rotary drive suitable for driving a rotatable member such as a drill, and powered by a piston engine.

Drills and other rotary elements are commonly driven by electrical drill motors. Electrical drill motors have poor stall characteristics, tend to be quite heavy, and can be used only near a source of electricity. It is desirable to provide a rotary drive with a piston engine for its power, because its stall-torque characteristics are better, it is not tied to a stationary power source and needs no cord, and it need be no heavier, and may even be lighter than an electrical motor of comparable power. However, such piston engine powered drives have not hitherto been practical, because a practical drive must be operable in all orientations, including upside down while working with a liquid fuel, and because they must be light and not transmit excessive vibration to the workman.

It is an object of this invention to provide a rotary drive powered by a piston engine which can weigh about the same as, or somewhat less than, a conventional electrical drill motor, which has good torque properties, and which, when overloaded, simply stalls out without overloading any circuitry. It is a further object of this invention to provide such a construction with a mount that can be utilized as a handle, as a fuel container to supply fuel for the engine in all angular orientations for suitable periods of time while isolating the user from much of the vibration of the engine, and as a protective "stand".

A rotary drive according to this invention, includes a frame to journal an output shaft which can drive a chuck or other means that in turn supports a driven element such as a drill. The frame also supports a piston engine, preferably of the two-cycle variety, and if desired also a gear reduction between the crankshift of the piston engine and the chuck. The frame is attached to a ringshaped mount which has an internal cavity, the cavity being at least partially filled with a porous material having interconnected open cells for receiving fuel. The region containing this material is connected to a fuel line leading to the carburetor of the engine, and fuel is withdrawn therefrom by suction. Throttle means is provided to set the position of the throttle valve for controlling the speed and power of the engine.

According to a preferred but optional feature of this invention, the ring-shaped mount extends substantially entirely around the engine, and the major part of its periphery is occupied by said cavity. The ring mount also guards the engine and its accessories.

According to another preferred but optional feature of this invention, additional handle means is provided to cooperate with the ring mount to form a stand.

The above and other features of this invention will be fully understood from the following detailed description and the accompanying drawings, in which:

FIG. 6 is a cross-section taken at line 6—6 of FIG. 1;

Figure 1:
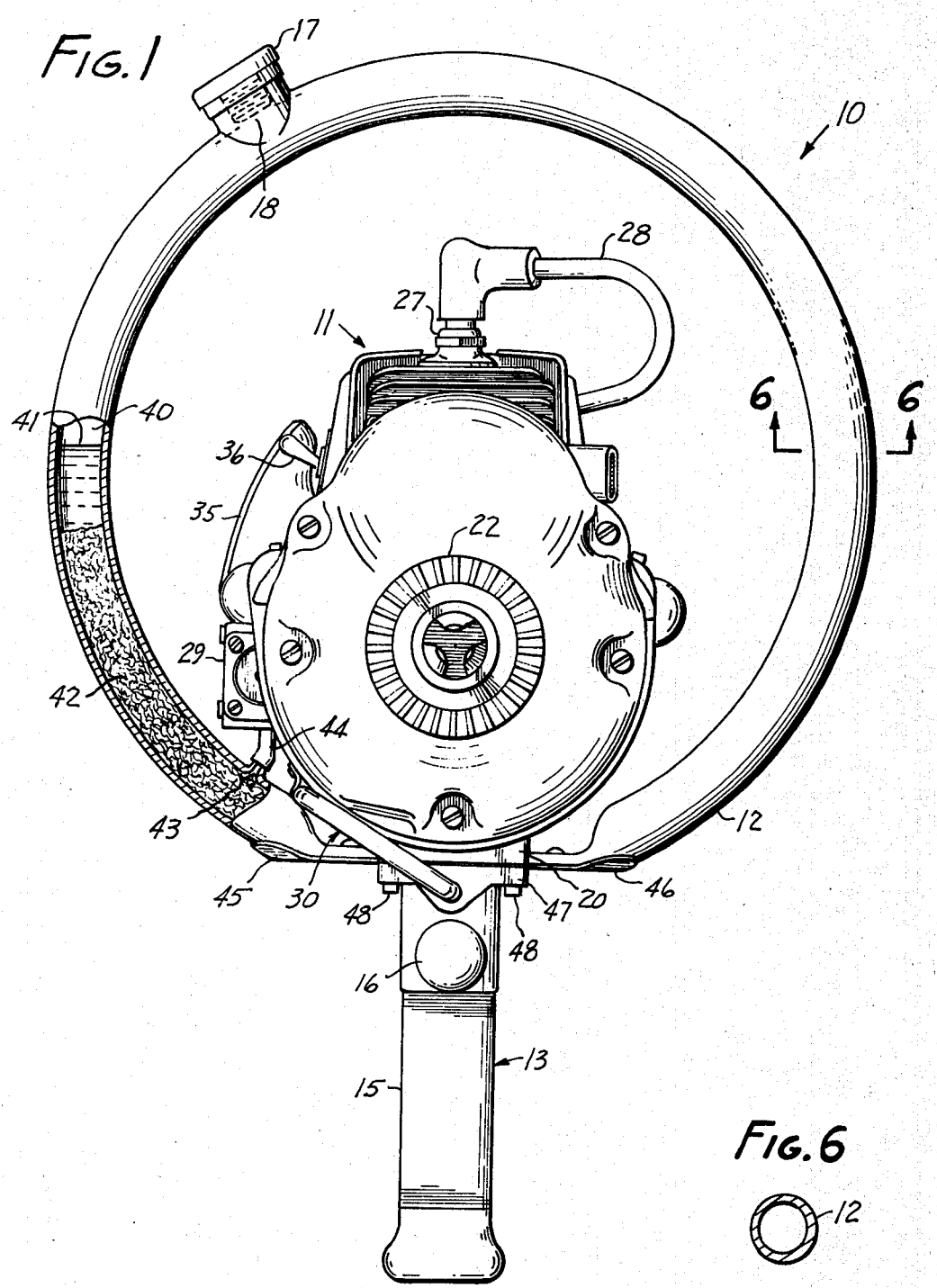
FIG. 1 is a side elevation, partly in cutaway cross-section, showing the presently preferred embodiment of the invention.

FIG. 1 shows a rotary drive 10 according to the invention. Its general features are a piston engine 11, preferably of the aircooled, single cylinder, two-cycle, type, which is well known in the small engine art, a ring mount 12 to which the engine is mounted through a frame, a bottom handle 13, and a rear handle 14. A trigger grip 15 is provided on handle 13, together with a throttle button 16. A fuel cap 17 is threaded into a fuel port 18 near the top of the ring mount.

Figure 3:
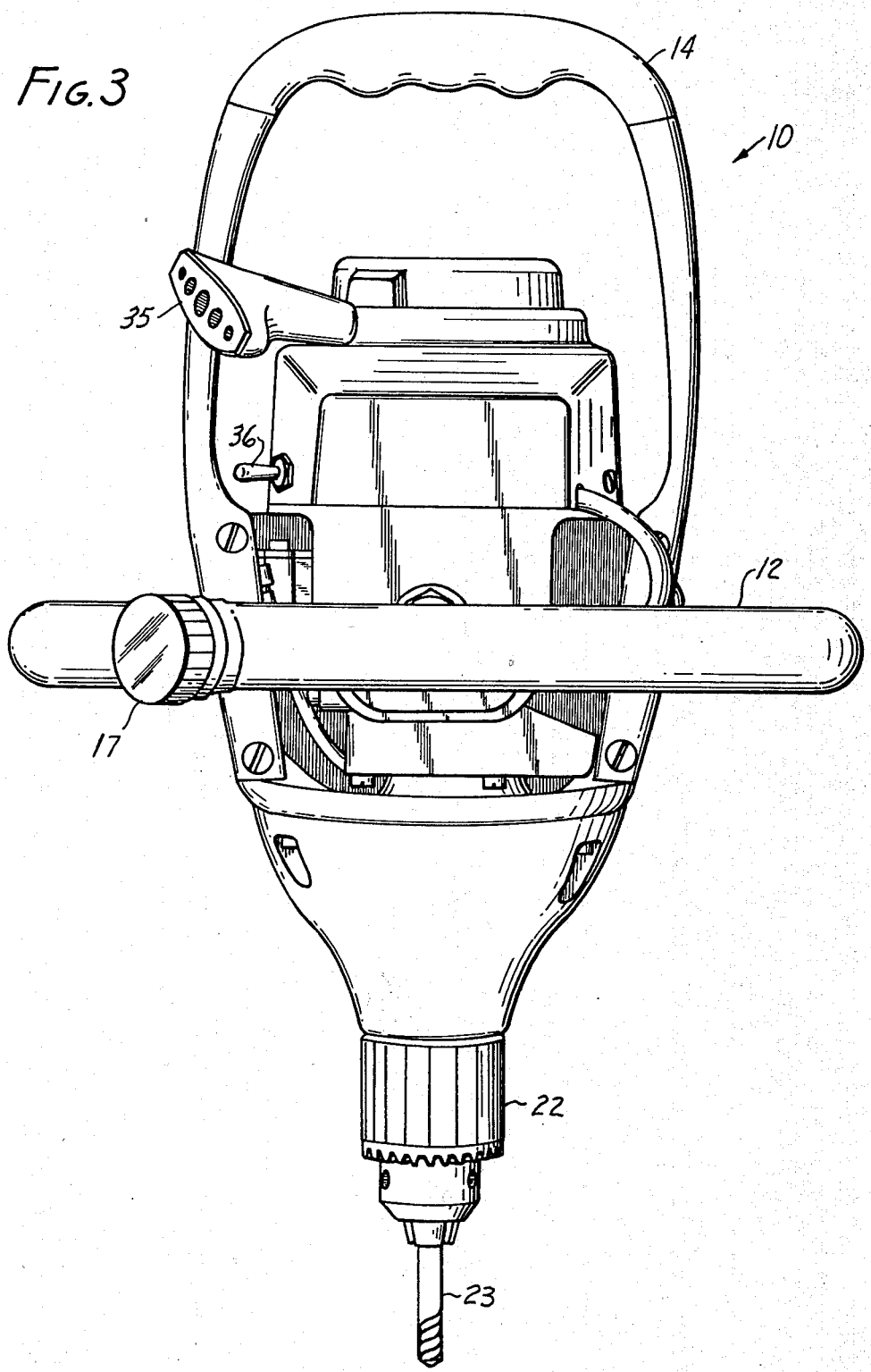
FIG. 3 is a top view of the invention.
Figure 4:
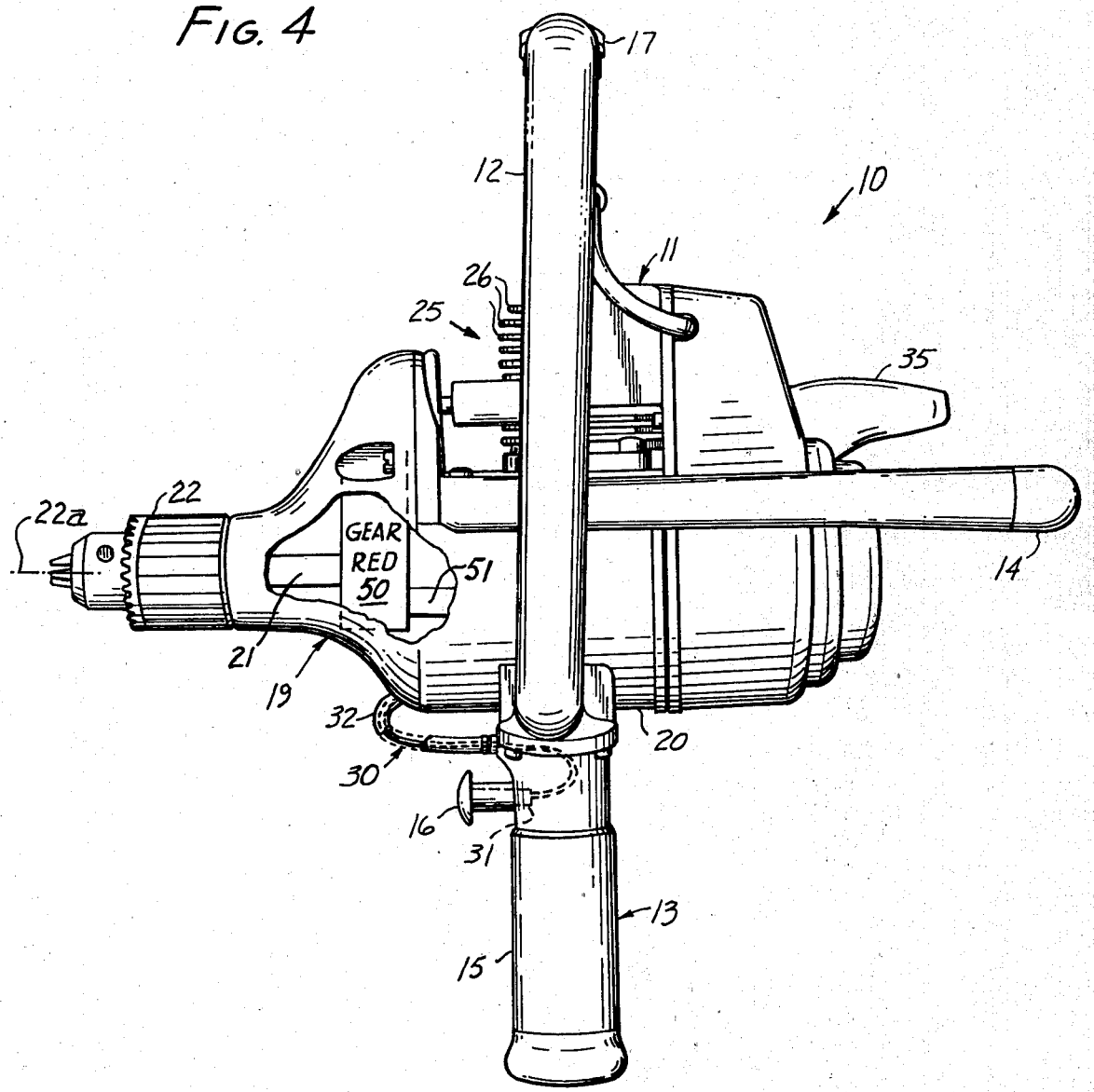
FIG. 4 is a right-hand side view of FIG. 1.
Figure 5:
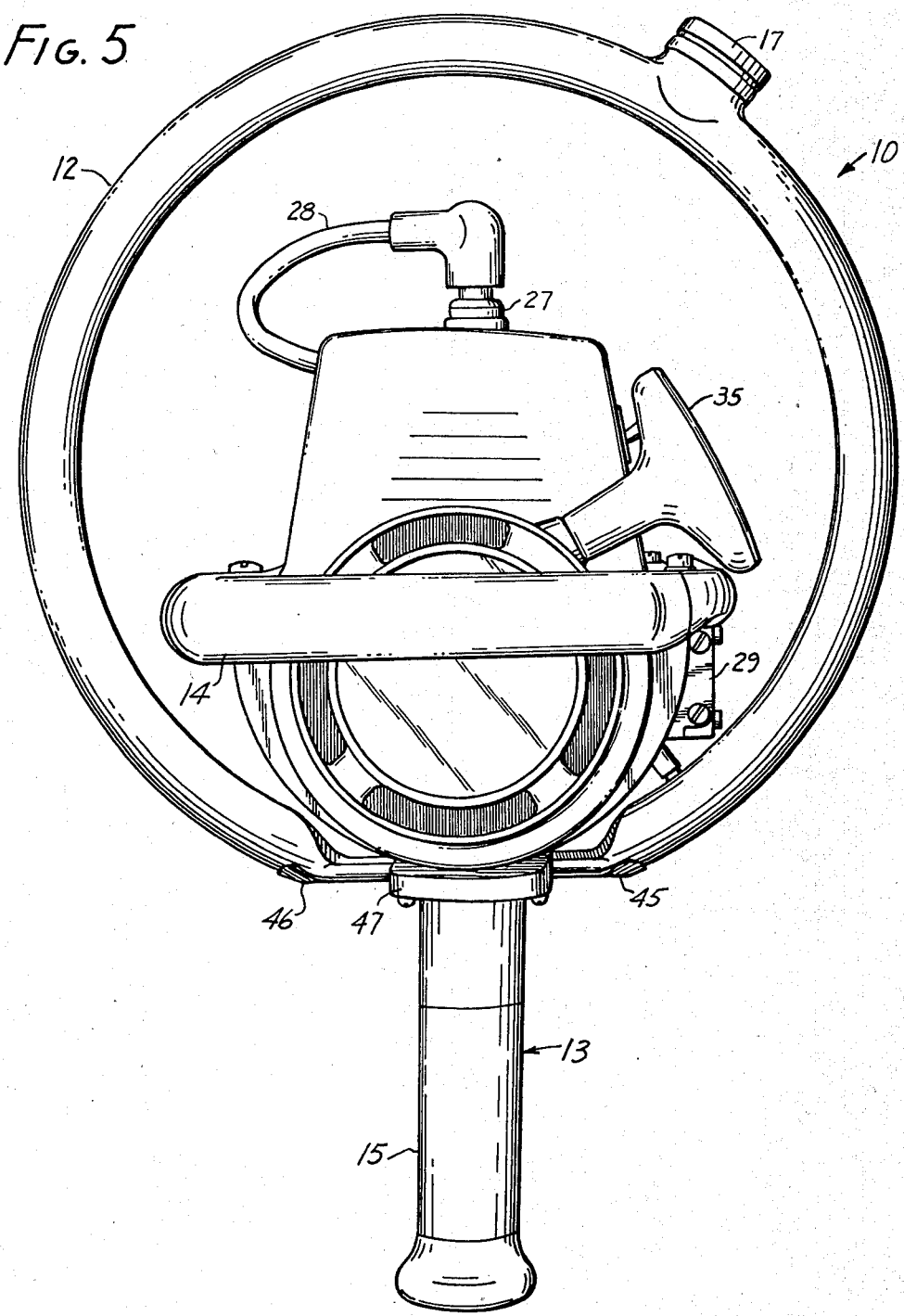
FIG. 5 is a rear view of FIG. 1.

A new reduction 19 is attached to frame 20 (which supports the piston engine). An output shaft 21 is journaled to the frame and is the output for the power developed by the engine. A standard drill chuck 22 is provided on the output shaft to hold a drill 23 (FIG. 3) or other article to be driven. Driving a drill is but a single example of many uses for this rotary drive.

The details of the engine itself may best be seen in FIGS. 2–5. It includes a cylinder head 25 with cooling fins 26. A spark plug 27 is fitted into the top of the cylinder head. An ignition wire 28 goes to an ignition current source, not shown. This is a conventional engine, and its details are not essential to this invention. Suffice it to say that within the cylinder head there is a cylinder with a reciprocable piston and a crankshaft, which crankshaft is rotated as the consequence of the reciprocation of the piston in the cylinder to provide the power.

A conventional carburetor 29 is mounted to the side of the frame to receive fuel from a cavity in the ring mount. A throttle valve, now shown, is disposed between the jets of the carburetor and the intake ports of the engine (also not shown) in accordance with known practice.

Figure 2:
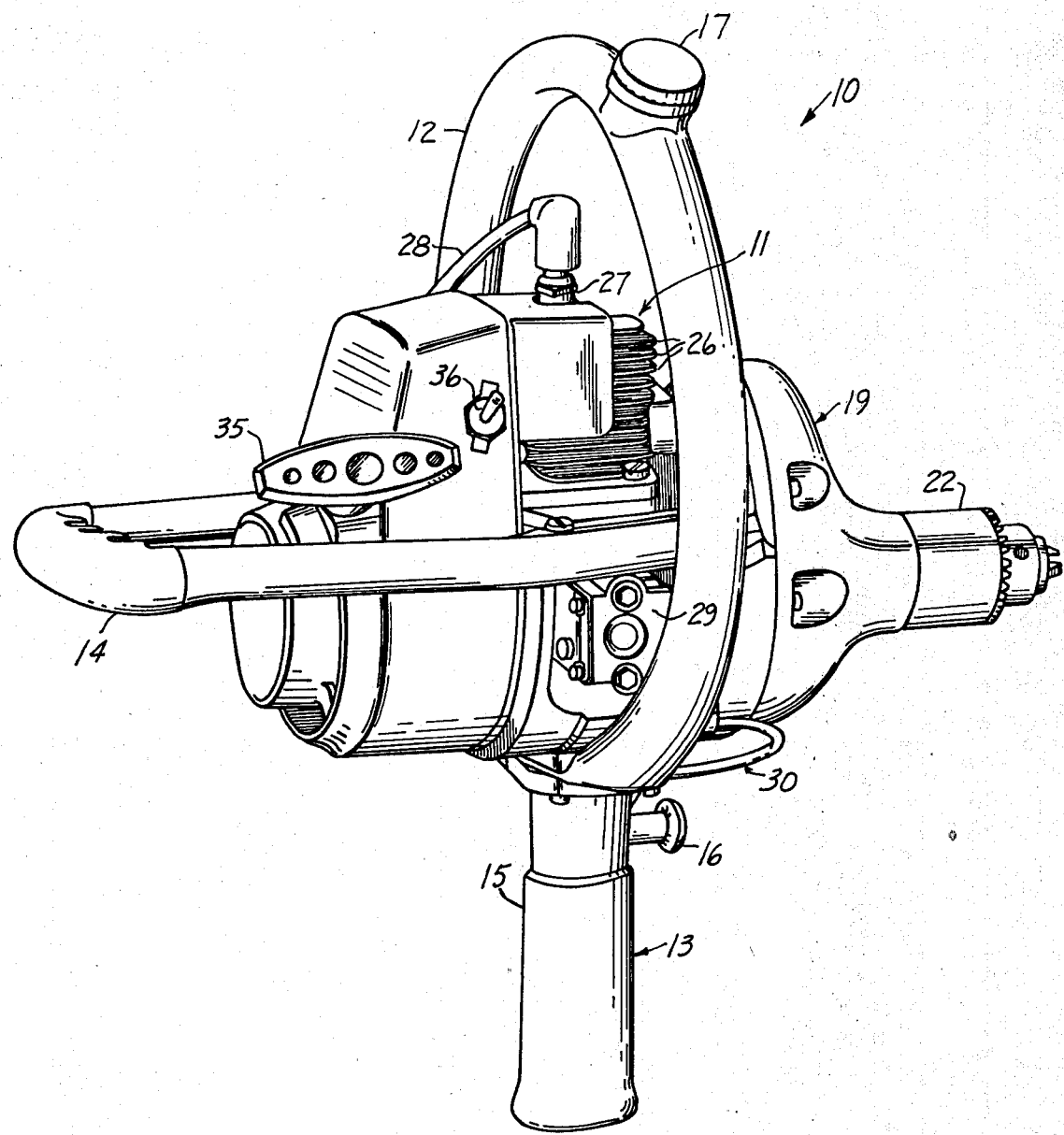
FIG. 2 is a rear quarter elevation of the invention.

A throttle cable 30 (FIG.4), conveniently a push-pull, flexible cable linkage with an interior push rod 31 and an external sheath 32, is mounted to the carburetor body and to the bottom handle. The external sheath is anchored at both of its ends so that the interior push rod can be shifted by moving the throttle button axially. The throttle button is reciprocably movable and is springloaded outwardly as shown in FIG. 2. Pushing the throttle button in toward the handle will move the push rod 31 to open the throttle and increase the speed of the engine. Releasing the button allows the throttle to close and the engine to slow down.

A starter cord handle 35 is shown which is connected to a cord that is pulled by the handle to start the engine. An ignition switch 36 is shown for disabling the engine by disconnecting the spark circuit.

The ring mount comprises a ring-shaped, circularly-sectioned piece of tubing having a central passage providing a fuel container 40. The fuel port 18 passes through the wall of the ring mount, and removable cap 17 closes it. A fuel level 41 is shown in FIG. 1 by way of illustration. Of course, the container may be completely filled, and for the full length thereof. A porous body 42 is placed in one side of the ring near its lower end. The porous body has a plurality of continuous interconnected cavities ("cells") leading to a fuel outlet 43. A suitable example of material for body 42 is porous cloth felt which can be soaked by th fuel, holding it in a myriad of interconnected cells and passages. Fuel outlet 43 connects to fuel line 44 that in turn discharges to the carburetor.

The ring mount if flattened at both ends to provide a pair of base flanges 45, 46. These base flanges are attached to a plate 46a that in turn is mounted to a base member 47 by screws 48 or other fastening means. The base flanges close the ends of the ring mount so as to close the fuel reservoir. The bottom handle is bolted to or part of the base member and to the frame so as to hold the construction together. It will now be seen that one can pick up the ring mount, and with it the entire drive the frame and the engine are quite flexibly mounted at one portion of the ring. The frame is mounted to the ring only at a single portion of its perimeter, and is not "cross-braced". The engine is somewhat pendularly mounted, projecting into the middle of the ring mount. Therefore, the engine's vibrations will be considerably dampened by the dampening qualities of the ring itself. Also, it will be appreciated that the rotary drive may be positioned by taking hold of the bottom and rear handles, or by the ring mount and the bottom handle. Similarly, it will be recognized that the throttle button could have been mounted elsewhere and still be within the scope of the invention.

The ring surrounds the engine and lies in a plane normal to the axis of rotation 22a of the output shaft. Therefore, it can be used as a convenient handle to press the drill into the workpiece. Also, it surrounds the engine and protects its parts, such as the spark plug, ignition wire, and cooling fins, from being broken off by casual blows. In addition, with one or the other of the handles, it forms a stand which supports the engine when the drive is laid down. A drawing of tangent planes to the structure will show that this arrangement supports the engine off the ground, and stably.

A gear reduction 50 is coupled to the crankshaft 51 of the engine, and in turn the gear reduction is coupled to the output shaft 21. The gear reduction may be made of any desired construction, but for lightness of weight there are available two preferred types. One is a train of spur gears and the other is a chainsprocket train, either of which can provide a suitably rugged speed reduction means to reduce the rotary speed from the relatively high speed of the motor to the relatively lower desired speed for the output shaft.

The ring mount not only provides a vibration-resisting mounting for the engine, but provides a fuel reservoir which is useful in any orientation of the rotary drive for suitable periods of time. It is essential that this drive be functional in all orientations, even including totally inverted positions, for sensible periods of time such as for from 20 to 30 seconds. The device of FIG. 1 provides such a device. A ring having a diameter of about 12 inches and the tube with inside diameter of about 3/4 inch and with a length of porous body 42 about 8 inches will provide fuel for that long a time in the inverted position, and of course there is no such short a time limitation when the drive is in such a position that fuel will flow to the fuel line. Also, even when inverted, there may be enough movement of the ring that the porous material will be re-supplied from fuel in other parts of the ring mounts, and operation will continue for an even longer time than the said minimum. This result occurs because, when the fuel reaches the porous body it tends, by virtue not only of gravity but of capillary action, to remain in the porous body unless actually sucked out of it, and this is what occurs because of suction exerted by the carburetor. Accordingly, with this construction, even with the device upside-down from the FIG. 1 position, fuel will be retained in the porous body sufficient to supply fuel to the carburetor for a sensible period of time, such as 20 or 30 seconds, before the engine quits for lack of fuel.

This device provides an elegant, simple and effective vibration mount. It provides a good grip to resist the reverse torque on the user, to press the drive toward the work, to guard the engine, and to form a stand. It provides a power source which can be controlled merely by opening the throttle to extract more power from the engine, and it provides a device which, when overloaded beyond its capacity, simply stalls out without overloading circuitry or constituting any risk to any person or circuit.

The device is simple to manufacture, rugged in construction, and effective in use.

This invention is not to be limited by the embodiment shown in the drawings and described in the description, which is given by way of example and not of limitation, but only in accordance with the scope of the appended claims.

We claim:

1. In combination: a piston-type, internal combustion engine, said engine having a carburetor and a throttle valve; a frame to which said engine is mounted; a circular ring mount to which said frame is mounted at only one portion of the perimeter of the ring mount, said ring mount extending peripherally around and spaced from the engine, with the engine projecting into the inside of the ring mount, and being unconnected to the ring mount except by the frame, said ring mount forming an internal fuel reservoir, said ring mount also having a fuel outlet leading to a fuel line connected to said carburetor; a porous body inside said fuel reservoir having continuously interconnected cavities for reception and retention of fuel and for supplying the same to the fuel line on suction demand by the engine; a throttle control linkage connected to the engine for controlling the power output thereof; and a rotary element rotatably driven by the engine.

2. A combination according to claim 1 in which the ring mount extends peripherally substantially entirely around the engine, and lies in a plane normal to the axis of rotation of the rotary element.

3. A combination according to claim 2 in which the cross-section of the ring mount is circular.

4. A combination according to claim 1 in which reduction gear means is mounted to the frame and the rotary element.

5. A combination according to claim 4 in which the reduction gear means is comprised of spur gears.

6. A combination according to claim 4 in which the reduction gear means comprises chains and sprockets.

7. A combination according to claim 1 in which a handle is mounted to the frame and in which a throttle control is mounted to the handle and connected to the engine for controlling the speed thereof.

8. A combination according to claim 7 in which another handle is formed as a bight at the opposite end of the motor from its output shaft.

9. A combination according to claim 2 in which a handle is attached to the drive extending transversely to the plane of the ring mount, forming with the ring mount a stand for the drive.

10. A combination according to claim 1 in which the rigidity of the ring mount and the weight of the engine are so related that the ring mount dampens the vibrations of the running engine.

11. A combination according to claim 10 in which the ring mount extends peripherally substantially entirely around the engine, and lies in a plane normal to the axis of rotation of the rotary element.

12. A combination according to claim 1 in which the ring mount is tubular, formed into a substantially complete circle with its two ends flattened to form base flanges to close the fuel reservoir, and to serve as means to attach the ring mount to the frame.

13. A combination according to claim 1 in which the base flanges are attached to a plate which in turn is attached to the frame.

14. A combination according to claim 13 in which the handle is attached to the said plate.

* * * * *